United States Patent

[11] 3,539,057

| [72] | Inventor | Theodore D. Bronner<br>642 B St., P.O. Box 497, Biggs, California 95917 |
|---|---|---|
| [21] | Appl. No. | 804,835 |
| [22] | Filed | March 6, 1969 |
| [45] | Patented | Nov. 10, 1970 |

[54] STORAGE TANK
10 Claims, 8 Drawing Figs.

[52] U.S. Cl. ................................................ 214/16;
34/228, 34/233; 52/2; 214/17
[51] Int. Cl. .................................................. B65g 3/08
[50] Field of Search .......................................... 214/16,
17.8; 52/2; 34/227, 228, 233

[56] References Cited
UNITED STATES PATENTS

| 2,730,150 | 1/1956 | Wunderwald et al. | 52/2X |
| 3,140,161 | 7/1964 | Poynor et al. | 214/16X |
| 3,280,473 | 10/1966 | Sullivan | 52/2X |

FOREIGN PATENTS

| 1,240,534 | 8/1960 | France | 214/17 |

Primary Examiner—Robert G. Sheridan
Attorney—Mellin, Moore and Weissenberger

ABSTRACT: A storage tank has a body made of flexible, collapsible air-impervious material. Conduits are positioned within the body and adjacent the base thereof and the body is fixed to the ground. Air is pumped into the conduits and into the body over a large area of conduit surface to inflate the body and keep it inflated. The inflated body is then filled with grain or the like, which may be removed when desired. The empty storage tank, with its body collapsed, may be easily and conveniently moved to another location or stored.

Patented Nov. 10, 1970 3,539,057
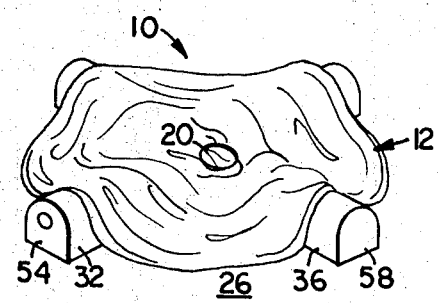
FIG_1
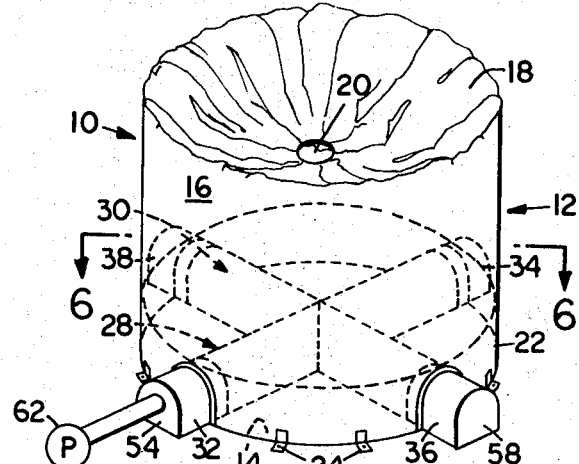
FIG_2
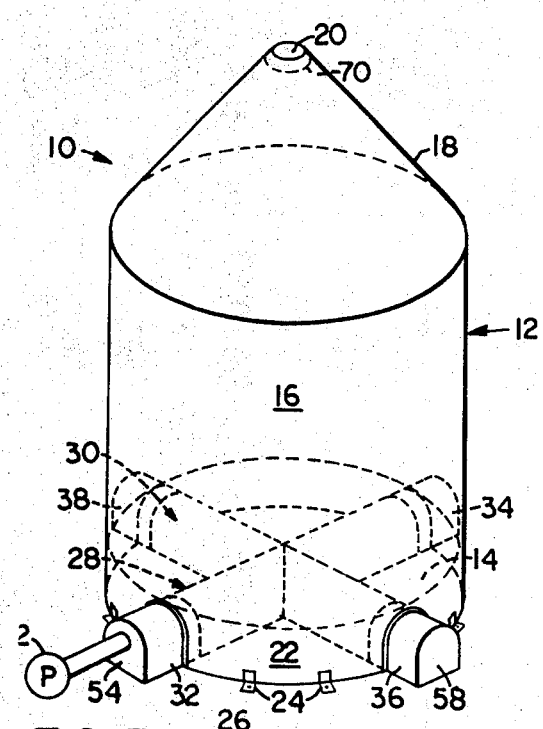
FIG_3
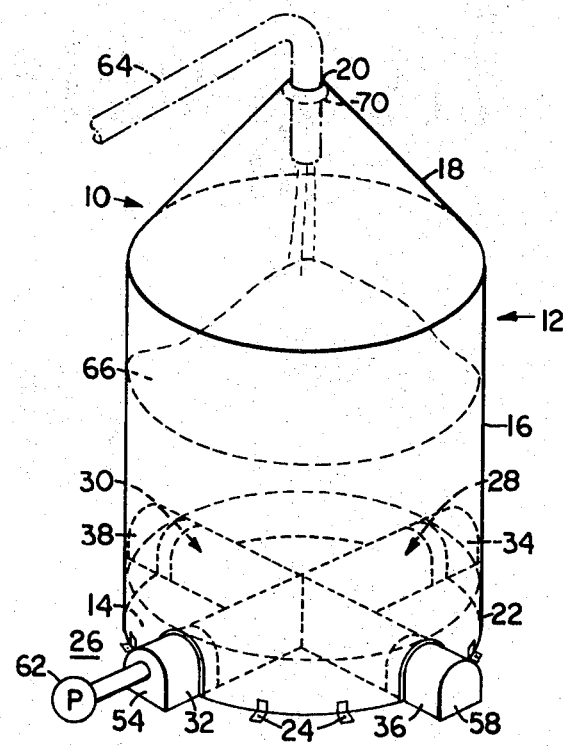
FIG_4
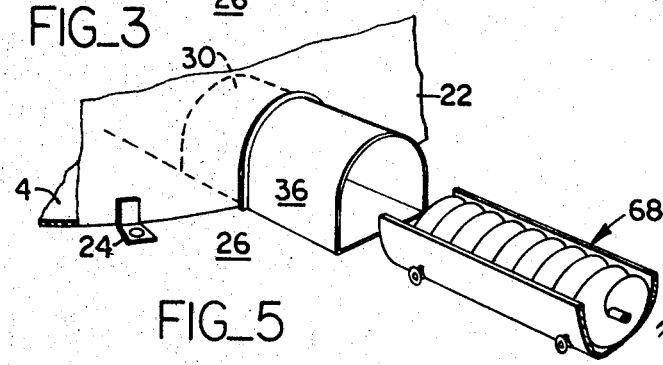
FIG_5
INVENTOR.
THEODORE D. BRONNER
BY
Mellin, Moore & Weissenberger
ATTORNEYS Patented Nov. 10, 1970
3,539,057
Sheet 2 of 2
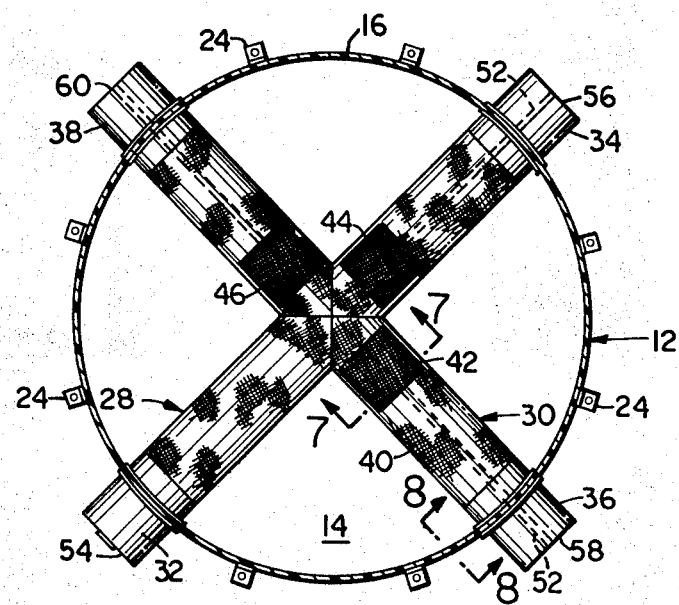
FIG_6
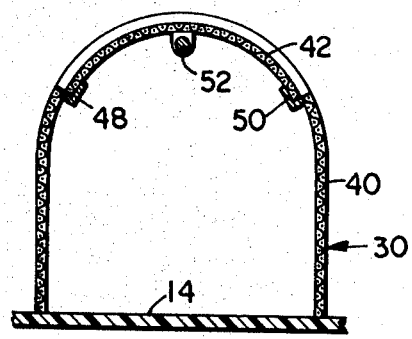
FIG_7
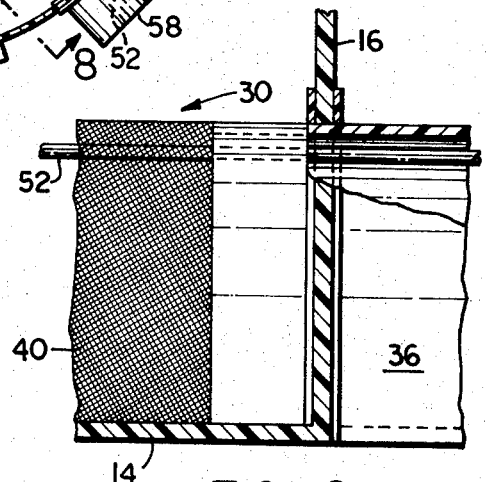
FIG_8
INVENTOR.
THEODORE D. BRONNER
BY
Mellin, Moore & Weissenberger
ATTORNEYS

STORAGE TANK

BACKGROUND OF THE INVENTION

This invention relates to storage tanks, and more particularly, to a tank for storing grain or the like, said tank being collapsible so as to be conveniently portable.

Generally, tanks for storing grain or the like have bodies which are made of steel which fix to a concrete foundation. Such a storage tank, obviously, requires a relatively great length of time for erection, and is not easily portable, since it must be completely disassembled and removed from the concrete foundation before it can be moved, and then reassembled on and fixed to another concrete foundation.

It would be desirable to provide a storage tank which is capable of effectively storing grain or the like, meanwhile being easily portable. Such features could be achieved by constructing the body of the tank of some sort of collapsible material which, when extended, defines a storage area for the grain or the like, and, when collapsed, can be easily moved. If the body is of air-impervious material, it could be inflated to provide such a storage area, and collapsed by forcing the air out of the body.

Buildings which are erected by inflation are known. See, for example, U.S. Pat. Nos. 2,910,994 (Joy), 3,197,044 (Hozak), 3,335,529 (Gedney), and 3,106,772 (Holcombe). However, in Hozak, only the roof of the structure is supported by air, with the walls thereof being of conventional corrugated steel structure. And in Holcombe, pneumatic bags are used in the construction of conventional, nonportable structures. Such patents therefore do not teach air-inflated structures which are portable.

Furthermore, since the storage tank is to be used for storing grain or the like, it would be desirable to provide a collapsible, air-inflated tank body into which the air flows over a relatively large area. Such large area of air flow would ensure an even distribution of air within the body so that the grain or the like therewithin can be properly and efficiently dried.

Gedney and Jay, while disclosing air-inflatable buildings, both utilize a relatively small air inlet which would have little or no drying effect on the material stored therein.

It is an object of this invention to provide a storage tank for grain or the like which is capable of properly storing such grain, meanwhile being collapsible to such an extent as to be easily portable.

It is a further object of this invention to provide a storage tank which, while fulfilling the above object, is inflated by air which flows within the body of the tank over a relatively large area.

It is a still further object of the invention to provide a storage tank which, while fulfilling the above objects, is extremely simple, inexpensive and convenient for use.

SUMMARY OF THE INVENTION

Broadly stated, the inventive storage tank for storing granular material comprises a flexible, collapsible, generally air-impervious body defining a circular floor, a tubular wall portion, and a generally frustoconical roof defining an aperture at its peak. Included are a pair of conduits within the body adjacent the floor, the conduits interconnecting and communicating at their midpoints and including screen material on the upper surfaces thereof which allows air to flow therethrough, the conduits being impervious to the granular material. Air pump means flow air into the conduits and upward through the screen material, whereby the body may be inflated and held in its inflated state by continuous introduction of air. Means are included for introducing the granular material into the inflated body and air can be pumped through said material to dry the same. Means are included for removing the granular material from within the body.

BRIEF DESCRIPTION OF THE DRAWINGS

These and other objects of the invention will become apparent from a study of the following specification and drawings, in which:

FIG. 1 is a perspective view of the storage tank, with the body thereof in its deflated state;

FIG. 2 is a perspective view of the storage tank, with the body thereof partially inflated;

FIG. 3 is a perspective view of the storage tank with the body thereof fully inflated;

FIG. 4 is a view similar to FIG. 3, showing the storage tank being loaded;

FIG. 5 is a perspective view of a portion of the storage tank, showing the means for unloading the tank;

FIG. 6 is a sectional view taken along the lines 6—6 of FIG. 2;

FIG. 7 is a sectional view taken along the line 7—7 of FIG. 6;

FIG. 8 is a sectional view taken along the line 8—8 of FIG. 6.

DESCRIPTION OF THE PREFERRED EMBODIMENT

Shown generally in FIGS. 1—3 is the inventive storage tank 10. Such storage tank 10 includes a body 12 which is made of flexible, air-impervious material, such as rubberized, water proof fabric or the like. The body 12 is made up of a circular floor 14, a tubular wall portion 16 bonded to the outer periphery of the floor 14, and a roof portion 18 bonded to the top edge of the wall portion 16. When the roof portion 18 is extended, it is frustoconical in configuration, and defines an aperture 20 at its peak. The bottom portion 22 of the tubular wall portion 16, and the floor 14, are of heavier material than that used for the rest of the body 12, being heavy enough to be rodent-proof. A plurality of tabs, such as tabs 24 are fixed to the bottom portion 22 for affixing the body 12 to the ground 26.

A pair of crossed conduits 28, 30 are disposed within the body 12, adjacent the floor 14. These conduits 28, 30 interconnect and communicate with each other at their midpoints. The ends 32, 34, 36, 38 of the conduits 28, 30 are of heavy, flexible air impervious material, similar to bottom portions 22. These ends 32, 34, 36, 38 extend sealingly along bottom portions 22 and through wall portion 16. As shown in FIGS. 6—8, these conduits 28, 30 include screen material 40 on a large amount of their upper surfaces. Also included on the upper surfaces of conduits 28, 30 are gates 42, 44, 46. Gate 42 is slidable, or operable on tracks 48, 50 (FIG. 7) by means of a rod 52 which extends therefrom through conduit 30 and through end 36 thereof. The other gates 44, 46 are similarly constructed. Doors 54, 56, 58, 60 are sealingly mounted to the open ends 32, 34, 36, 38 of conduits 28, 30, and are removable therefrom.

In the use of such storage tank 10, the conduits 28, 30 which may be in sections, are assembled in the body 12 and said body 12 is positioned in its collapsed condition (FIG. 1) at the place where it is to be erected. The tabs 24 are affixed to the ground 26. An air pump 62 is connected to and communicates with conduit 28, through an opening in door 54. When the air pump 62 is turned on, air flows through conduits 28, 30. The screen material 40 being air pervious, the air flows therethrough over a generally large area and into the body 12. In this way the body 12 is inflated, with some air escaping through aperture 20 (FIGS. 2 and 3). The body 12 is held in its inflated state by continuous introduction of air into body 12, by air pump 62.

When the body 12 is fully inflated, and with the air pump 62 still operating to hold the body 12 erect, the grain or the like is loaded into the tank 10 by a screw conveyor 64 which feeds in through aperture 20. Such loading of grain 66 is shown in FIG. 4. The conduits 28, 30 including screen material 40, are impervious to the grain 66. That is, the screen material 40 is of fine enough mesh so as not to let the grain 66 pass through. Meanwhile, the air introduced into the body 12 flows thereinto over the generally large area of the screen material 40. Such large flow area insures that the air acts on a large part of the grain 66 within the tank 10, so that it is properly dried. When the tank 10 is filled, the air pump 62 is stopped, the grain 66 holding the body 12 erect. The grain 66 is thus stored in this manner. A cap (not shown) may be provided to cover aperture 20 during such storage.

It is to be noted that the outward, downward angle of the frustoconical roof portion 18 is chosen to be substantially the same as the angle of inclination (the outward, downward sliding angle of the grain 66), poured into a mound, as shown in FIG. 4. Such construction means that the tank 10 may be loaded until it is substantially full, since the angle of inclination of the surface of the mound, no matter what its height, is about equal to the outward, downward angle of the roof portion 18. It also means that where the tank 10 is full and the air pump 62 is stopped, the grain 66 puts little or no load on the roof portion 18.

It should also be noted that conduits 28, 30 may with advantage be of sufficient dimension to allow a man to crawl into them, so that he may check the temperature or moisture content of the grain 66, or the like.

To unload the grain 66 from the tank 10, a wheeled conveyor 68 or the like is positioned within one of the conduits, as conduit 30 (FIG. 5), under gate 42. Gate 42 is opened by means of rod 52, the conveyor 68 being positioned to remove the grain 66 falling through the open gate 42 and convey the grain 66 from the tank 10. During such removal of grain 66, the air pump 62 is on, keeping the body 12 inflated.

When the grain 66 is down to the level of the tops of conduits 28, 30, the remaining grain 66 may be shoveled out or removed by a vacuum apparatus (not shown).

When substantially all the grain 66 is removed, the air pump 62 is turned off, allowing the body 12 to collapse. Such collapsing is aided by a weight ring 70 adjacent aperture 20. Such weight ring 70, being generally in the center of the tank 10, ensures that the body 12 collapses in a controlled manner to the point shown in FIG. 1.

With the body 12 in such collapsed state, the tank 10 may easily be moved to where it can be stored, or to another area for inflation and storage of other material. Shipping of the tank 10 in its deflated state, of course, results in minimum shipping rates.

It will be understood that the storage bins may be of various dimensions, depending on what is to be stored.

It will be seen that herein is provided a storage tank for storing grain or the like, which is capable of properly storing the grains or the like, meanwhile being collapsible to such an extent as to be easily portable. The air which is used to inflate the body of the tank flows over a relatively large area, aiding in the drying of the grain or the like. The grain storage tank as disclosed herein has, furthermore proven to be inexpensive, and quite convenient for use.

I claim:

1. A storage tank for storing material comprising:
   a. a flexible, collapsible, generally air-impervious body defining a floor fixed to the ground, walls and a roof;
   b. access means within the body adjacent the floor and extending through the walls including means for introducing air over a generally large area of the floor within the body, whereby the body may be inflated and held in its inflated state by continuous introduction of the air, the access means also including means for removing the material from within the body at a plurality of points over the area of the floor; and
   c. means for introducing the material into the inflated body.

2. A storage tank according to claim 1 wherein the access means comprise an air pump, and conduit means within the body and connected to the air pump, the conduit means including an air-pervious portion as part thereof and through which air flows, the entire conduit being impervious to the material to be stored.

3. A storage tank according to claim 2 wherein the base is generally circular, the walls define a tubular wall surface, and the roof is generally frustoconical and defines an aperture at its peak.

4. A storage tank according to claim 3 wherein the material to be stored is granular and wherein the outward, downward angle of the frustoconical roof is substantially the same as the outward, downward sliding angle of granular material poured into a mound thereof.

5. A storage tank according to claim 4 wherein are further included weight means adjacent the aperture in the roof which aid in collapsing the body when the body is substantially empty and the introduction of air is discontinued.

6. A storage tank according to claim 2 wherein the conduit means include a gate portion openable to allow granular material to fall therethrough, wherein are further included means for opening and closing the gate portion, and wherein the means for removing the granular material from within the body comprise conveyor means positionable into the conduit means to move the granular material falling through the open gate portion and conveying such granular material thereon.

7. A storage tank for storing granular material comprising:
   a. a flexible, collapsible, generally air-impervious body defining a circular floor, a tubular wall portion, and a generally frustoconical roof defining an aperture at its peak;
   b. a pair of conduits within the body, adjacent the floor, the conduits interconnecting and communicating at their midpoints and including screen material on the upper surfaces thereof which allow air to flow therethrough, the conduits being impervious to the granular material;
   c. air pump means for flowing air into the conduits and upward through the screen material, whereby the body may be inflated and held in its inflated state by continuous introduction of air;
   d. means for introducing the granular material into the inflated body; and
   e. means for removing the granular material from within the body.

8. A storage tank according to claim 7 wherein the outward, downward angle of the frustoconical roof is substantially the same as the outward, downward sliding angle of granular material poured onto a mound thereof.

9. A storage tank according to claim 8 wherein are further included weight means adjacent the aperture in the roof which aid in collapsing the body when the body is substantially empty and the introduction of air is discontinued.

10. A storage tank according to claim 9 wherein the conduits include a gate portion openable to allow granular material to fall therethrough, wherein are further included means for opening and closing the gate portion, and wherein the means for removing the granular material from within the body comprise conveyor means positionable into one of the conduits to receive the granular material falling through the open gate portion and conveying said granular material thereon.